Aug. 7, 1945.    A. R. LEYERLE    2,381,608
DEHYDRATION TRAY
Filed Sept. 13, 1943    2 Sheets-Sheet 2

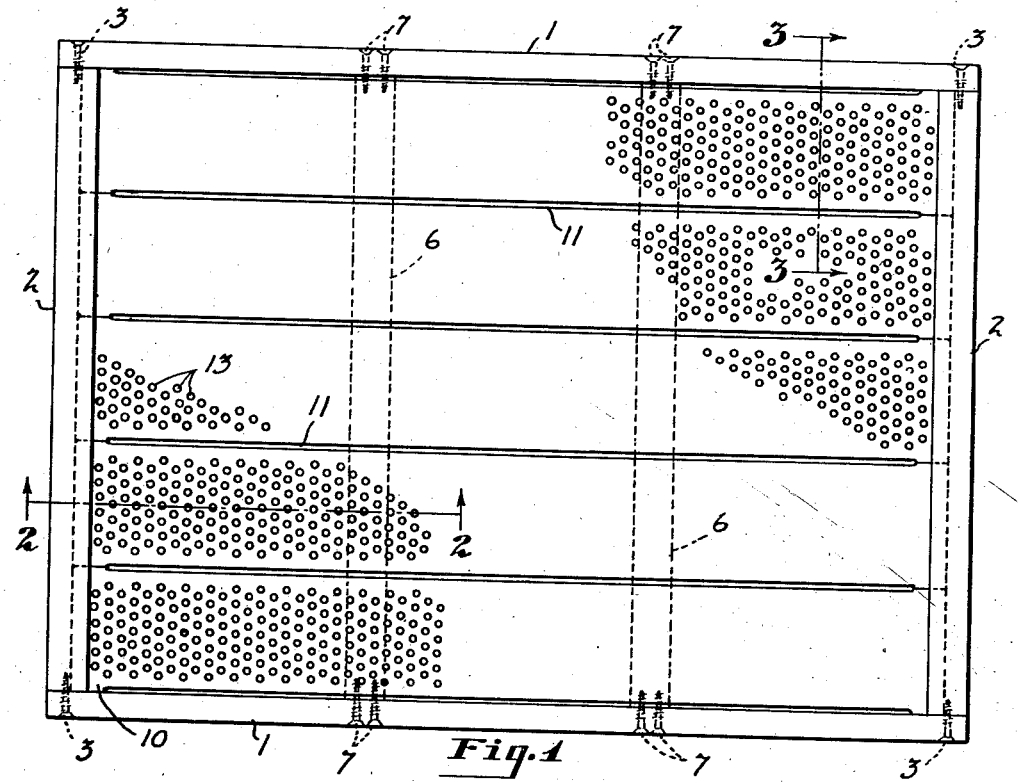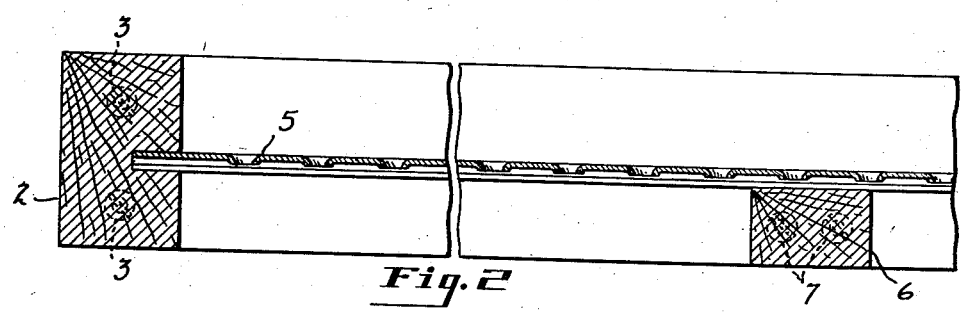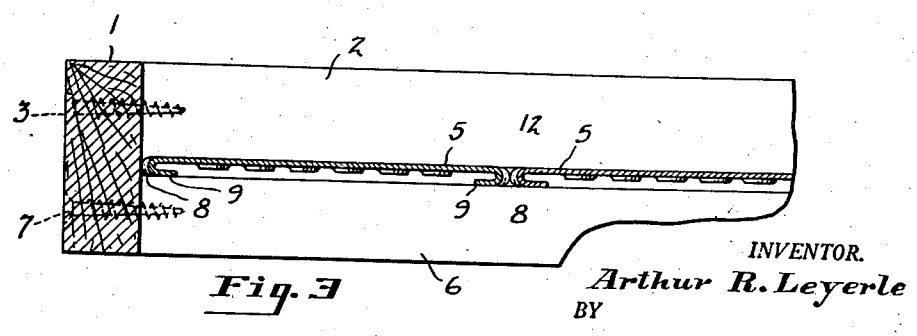

INVENTOR.
Arthur R. Leyerle
BY
Evans + McCoy
ATTORNEYS

Patented Aug. 7, 1945

2,381,608

UNITED STATES PATENT OFFICE 2,381,608

DEHYDRATION TRAY

Arthur R. Leyerle, Cleveland, Ohio, assignor to Vitreous Steel Products Co., Cleveland, Ohio, a corporation of Ohio Application September 13, 1943, Serial No. 502,159

2 Claims. (Cl. 34—237)

This invention relates to trays suitable for supporting materials being processed by heat or being treated to effect changes in chemical composition.

Important objects of the present invention are to provide a tray of simple and inexpensive construction that is strong, durable and sanitary, that permits free circulation of air or other fluid through the material being processed, and that is resistant to chemicals and a good conductor of heat.

It is also an object of the invention to provide a tray consisting of a frame and a bottom composed of detachably mounted slats that are so constructed that the products treated are easily freed therefrom and so mounted that they can be easily assembled in or removed from the frame so that the tray may be thoroughly cleaned and used successively for different materials without contamination of the products and without impairing the flavor or changing the chemical composition of the product.

A further object of the invention is to provide supporting slats of sheet metal that are perforated for free circulation of air or other fluid and that are formed with rounded shoulders along each of the perforations and along the side edges, the slats being covered throughout their top and bottom surfaces and their rounded shoulders with a fused on coating of vitreous enamel providing a smooth hard surface upon all portions of the tray with which the products come in contact. The vitreous enamel coating is a good conductor of heat and is unaffected by any heat to which the tray may be subjected in service and is impervious to any acids that may be contained in the products being treated.

With the above and other objects in view, the invention may be said to comprise the tray as illustrated in the accompanying drawings hereinafter described and particularly set forth in the appended claims, together with such variations and modifications thereof as will be apparent to one skilled in the art to which the invention relates.

Reference should be had to the accompanying drawings forming a part of this specification in which:

Figure 1 is the top plan view of the tray embodied in the invention;

Fig. 2 is a fragmentary section on an enlarged scale taken on the line indicated at 2—2 in Fig. 1;

Fig. 3 is a fragmentary section on an enlarged scale taken on the line indicated at 3—3 in Fig. 1;

Figure 4:
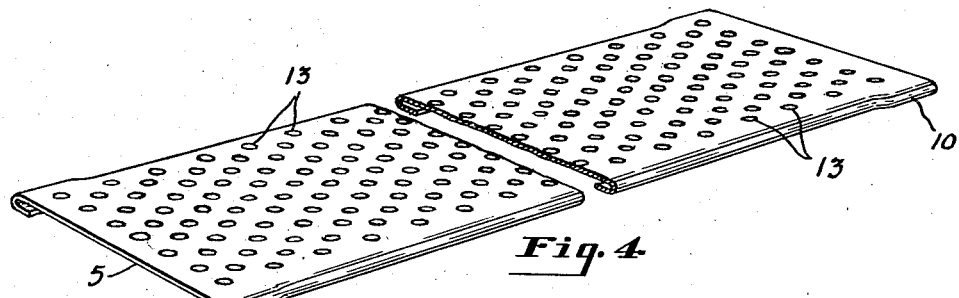
Fig. 4 is a perspective view of one of the slats.

Referring to the accompanying drawings, the tray of the present invention is provided with a rectangular frame comprising side bars 1 and end bars 2 secured to the side bars at their ends by means of screws 3. The end bars 2 are provided on their inner sides with longitudinal grooves 4 that provide retaining slots and supporting ledges for slats 5 that form the bottom of the tray. Intermediate the ends thereof the frame may be provided with cross bars 6 that have their top faces in the plane of the bottoms of the grooves 4 so as to provide intermediate supports for the slats 5, the cross bars 6 being secured in the frame by suitable means such as screws 7.

Figure 8:
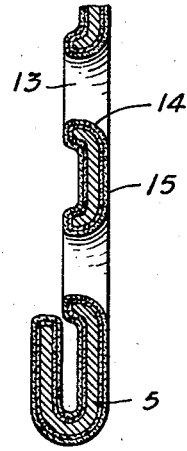
Fig. 8 is a section on an enlarged scale taken on the line indicated at 8—8 in Fig. 5.

The slats 5 are formed of sheet material that is heat-resistant and that is unaffected by the acids contained in the products; the slats 5 are preferably formed of sheet metal and covered on their upper and lower faces with a coating of vitreous enamel. At the side edges thereof, the slats 5 have curved flanges 8 that have external marginal portions 9 spaced from the bottom surface of the slats and parallel thereto. Each slat has an end portion 10 slightly wider than the intermediate portions thereof and the slats are disposed side by side within the frame with their wider end portions 10 abutting so that narrow elongated slots 11 are formed between the adjacent slats. The curved side flanges 8 provide rounded shoulders 12 along the opposite edges of each of the slots 11. Throughout the width and length of each of the slats 5, closely spaced perforations 13 are formed, and the metal around each of the perforations 13 is depressed to form rounded shoulders 14 at the margins of the perforations. The top and bottom surfaces of the slats have a fused vitreous enamel coating 15 that extends over the rounded shoulders 12 at the edges of the slats and also over the rounded shoulders 14 bordering the perforations 13, as shown in Figure 8, so that all portions of the slats with which the products may contact have a smooth coating of vitreous enamel. By reason of the rounded shoulders, a smooth vitreous enamel coating extends into the slots and perforations and prevents contact of the products with metal surfaces. The rounded shoulders also insure a continuous enamel coating over the marginal edges of the slots and perforations and prevent chipping of the enamel. By reason of the fact that the vitreous enamel provides a smooth hard surface and by reason of the fact that all edges are rounded, the surfaces of the slats can be readily cleaned after each operation. One of the end bars 2 can be readily removed by removing the screws 3 and the slats 5 may be detached from the frame to permit both the frame and slats to be thoroughly cleaned.

Figures 5, 7:
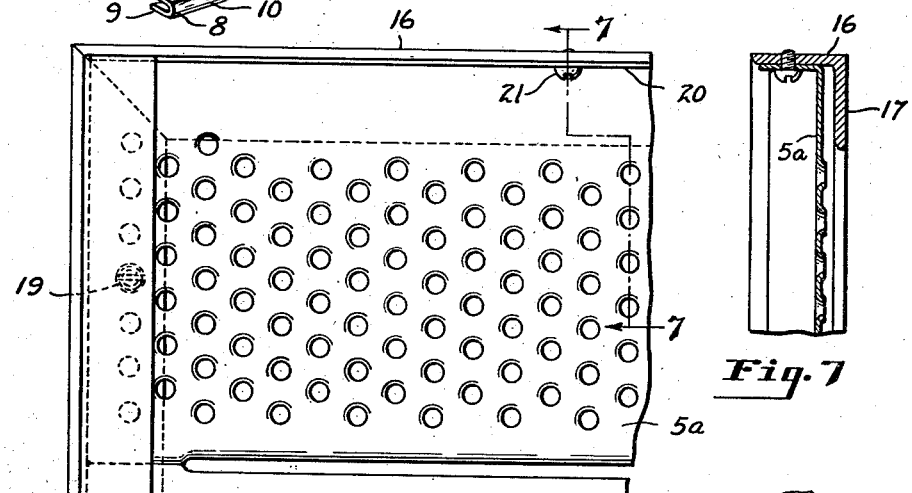
Fig. 5 is a fragmentary plan view showing the modified form of the frame.
Fig. 7 is a section taken on the line indicated at 7—7 in Fig. 5.
Figure 6:
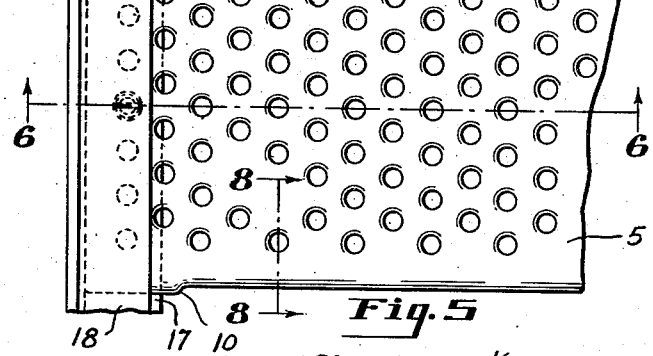
Fig. 6 is a section taken on the line indicated at 6—6 in Fig. 5.

In Figures 5 and 6 of the drawings, a modified structure is shown in which a rectangular angle iron frame 16 is provided for supporting the slats 5. The frame 16 has horizontal inwardly projected flanges 17 to provide supporting ledges for the slats 5. At the sides of the frame, the slats 5 are secured in place by means of retaining strips 18 which overlie end edges of the slats 5 and which are held in place by screws 19 that extend through the flanges 17 and through perforations 13 in the slats adjacent their ends.

The slats 5a at the ends of the tray may each be provided with an upturned side flange 20 that is secured to the frame 16 by means of screws 21.

It will be apparent that the present invention provides a tray that is sanitary, durable and convenient and that the tray may be constructed of the size and shape required for the particular oven drying rack or the like with which the tray is to be used.

It is to be understood that the embodiments of the invention herein shown and described are illustrative only and that various modifications in shape, relative dimensions and other details of construction may be made without departing from the spirit of the invention.

What I claim is:

1. A processing tray comprising a rectangular supporting frame having interior supporting ledges intermediate the top and bottom of the frame at opposite ends thereof, and a bottom composed of slats positioned side by side, and having end portions wider than intermediate portions, and abutting edge to edge and resting on said ledges, said slats having closely spaced perforations distributed substantially throughout the length and breadth thereof, the side edges of the narrow portions of said slats being spaced apart throughout the major portion of the length of the slats to provide narrow elongated slots between them, each slat having rounded flanges extending downwardly and inwardly from the side edges thereof to provide rounded shoulders along the edges of said slots.

2. A processing tray comprising a rectangular supporting frame having interior supporting ledges at opposite ends thereof, and a bottom composed of perforated slats positioned with their ends abutting side by side on said ledges, portions of said slats intermediate the ends thereof being narrower than the ends thereof to provide elongated longitudinal slots between the slats, the narrower portions of each of the slats having curved flanges extending downwardly and inwardly from the side edges thereof to provide rounded shoulders along the edges of said slots.

ARTHUR R. LEYERLE.